United States Patent
McCallister et al.

(10) Patent No.: US 9,098,210 B2
(45) Date of Patent: Aug. 4, 2015

(54) AUTOMATICALLY LINKING PARTITIONS ON A TAPE MEDIA DEVICE

(75) Inventors: Ryan P. McCallister, Erie, CO (US); David Howard, Guildford (GB)

(73) Assignee: ORACLE AMERICA, INC., Redwood City, CA (US)

( * ) Notice: Subject to any disclaimer, the term of this patent is extended or adjusted under 35 U.S.C. 154(b) by 1216 days.

(21) Appl. No.: 12/608,161

(22) Filed: Oct. 29, 2009

(65) Prior Publication Data

US 2011/0107023 A1 May 5, 2011

(51) Int. Cl.
*G06F 12/00* (2006.01)
*G06F 3/06* (2006.01)

(52) U.S. Cl.
CPC ............ *G06F 3/0664* (2013.01); *G06F 3/0608* (2013.01); *G06F 3/0644* (2013.01); *G06F 3/0652* (2013.01); *G06F 3/0686* (2013.01); *G06F 3/0665* (2013.01); *G06F 3/0682* (2013.01)

(58) Field of Classification Search
CPC ..... G06F 12/00; G06F 3/0664; G06F 3/0665; G06F 3/0644; G06F 3/0608; G06F 3/0682; G06F 3/0686; G06F 3/0652
USPC ........... 711/111, 173, 103, E12.103, E12.002
See application file for complete search history.

(56) References Cited

U.S. PATENT DOCUMENTS

| | | | | |
|---|---|---|---|---|
| 5,546,557 A * | 8/1996 | Allen et al. | | 711/111 |
| 5,710,676 A | 1/1998 | Fry | | |
| 6,493,166 B1 * | 12/2002 | Takayama | | 360/69 |
| 7,620,765 B1 * | 11/2009 | Ohr et al. | | 711/4 |
| 8,078,798 B2 * | 12/2011 | Kishi | | 711/111 |
| 8,782,232 B2 * | 7/2014 | Muhlestein et al. | | 709/226 |
| 2002/0015249 A1 | 2/2002 | Takayama | | |
| 2005/0050263 A1 | 3/2005 | Ashton | | |

(Continued)

FOREIGN PATENT DOCUMENTS

| JP | H11224477 | 8/1999 |
|---|---|---|
| JP | 2001283563 | 3/2003 |

OTHER PUBLICATIONS

Extended European Search Report dated Aug. 21, 2012 for EP Application No. 10 18 8740.

(Continued)

*Primary Examiner* — Pierre-Michel Bataille
(74) *Attorney, Agent, or Firm* — Marsh Fischmann & Breyfogle LLP; Kent A. Lembke (57) ABSTRACT

A system and method for automatically linking partitions on storage media for use within a storage management system is provided to minimize wasted space on the storage media, the time and expense traditionally spent reclaiming partitions containing invalid data, and the computer processing capability required to write data to and read data from the storage media. The storage management system includes a partitioned storage tape, a host application running on a server, and an archive device. The host application is operative to track location information for each host file or data object written to the storage tape. Using the location information, the host application is able to identify one or more "free" or writable partitions that are created on the storage tape as host files expire. Moreover, when writing host files to the storage tape, the archive device is operative to automatically link the writable partitions to form logical volumes such that when reading host files from the storage tape, the archive device can automatically navigate through the logical volumes.

20 Claims, 7 Drawing Sheets

(56) References Cited

U.S. PATENT DOCUMENTS

2008/0162813 A1* 7/2008 Haustein et al. .............. 711/115
2008/0301363 A1* 12/2008 Kitamura et al. ............. 711/111
2009/0055616 A1    2/2009 Kishi
2009/0300279 A1* 12/2009 Helsley et al. ................ 711/111

OTHER PUBLICATIONS

Japanese Foreign Office Action, for Japanese Patent Application No. 2010-241298, Sep. 2, 2014.

* cited by examiner

AUTOMATICALLY LINKING PARTITIONS ON A TAPE MEDIA DEVICE

BACKGROUND OF THE INVENTION

1. Field of the Invention

The present invention relates, in general, to methods and systems of data storage management, and more particularly, to a design for automatically linking partitions on storage media.

2. Relevant Background

Modern storage media devices (e.g., magnetic storage tapes, cassettes, multi-volume cartridges) oftentimes used in large-scale storage management applications hold hundreds to thousands of gigabytes of data. To better utilize this immense data-storage capacity, multiple data objects (e.g., host files or virtual tape volumes) are "stacked" on a single storage tape, with each set of data having different invalidation (e.g., expiration) parameters. When a particular data set expires, it creates "gaps" or wasted space on the tape. Over time, the wasted space becomes so large that the tape must be reclaimed. Reclaiming involves copying the valid data remaining on the tape and moving it to a contiguous space, usually at the beginning of the tape, such that the previously wasted space becomes useful for rewriting.

Discrete tape partitioning was developed to address the time and expense required in reclaiming storage tapes. Discrete tape partitioning involves dividing a storage tape into multiple discrete partitions such that once data has expired from a particular partition, that partition may be rewritten. While discrete tape partitioning has existed for many years, it has significant drawbacks and has been unpopular with developers. For instance, in discrete partitioning, only a host (e.g., a host application running on a mainframe server) may track which partitions contain valid data as well as the locations of the data objects or host files as stored within the tape partitions. Because each partition is separate and distinct, the host application must be involved in processing at the end of each partition in order to properly direct an archive device (e.g., a tape drive) to the next applicable partition in both read and write operations. If the archive device is reading data from the tape, the host must direct the archive device to the next partition that contains data associated with the host file being read. If the archive device is writing data to the tape, the host must direct the device to the next partition that is free of valid data and, therefore, available for rewriting.

SUMMARY OF THE INVENTION

The inventors have recognized that while discrete storage tape partitioning allows each discrete partition on a storage tape to be reused as the data contained within the partition expires, discrete partitioning is exceptionally processing intensive. That is, without any type of linking between multiple partitions that store a single data object or a series of related data objects, a host application must be directly involved in processing (i.e., reading or writing) each partition in order to ensure that the data is properly written to and/or returned from the storage tape. This significant host involvement in the complexities of handling and storing data wastes valuable computing resources while unacceptably slowing a storage system's ability to efficiently store data to and retrieve data from a storage tape. These and other issues are addressed with a storage system and method that utilizes automatic linking between partitions on a storage tape as discussed below and shown, in one example, in FIGS. 1-6.

More particularly, a method of writing data to storage media is provided. The method includes the step of dividing a storage tape into a number of writable automatically linked partitions ("ALPs"). Once divided, a controlling host application may provide a writable mask to an archive device upon which the storage tape is mounted. The writable mask may inform the archive device regarding the writable ALPs. The method may further include writing a first set of data objects (e.g., virtual tape volumes or host files) to the storage tape, where the data objects span a substantial and contiguous portion of the writable ALPs, and the host application may track mapping information that identifies a location of each of the data objects written to the storage tape. Using the mapping information upon an invalidation of one or more of the data objects, the host application may identify one or more rewritable ALPs (i.e., ALPs that no longer contain valid data and thus can be rewritten) that are distributed contiguously or non-contiguously throughout the storage tape and provide an updated writable mask that informs the archive device of the rewritable ALPs. Upon receipt of the updated writable mask, the archive device may write an additional set of data objects to the storage tape within one or more of the rewritable ALPs. In writing the additional set of data objects, the archive device may automatically transition between the rewritable ALPs.

A variation of the method includes continuously repeating the steps of tracking mapping information identifying a location of each of the data objects, identifying one or more rewritable ALPs, providing an updated writable mask, and writing an additional set of the data objects. In another variation, the writing steps may be completed over two or more mount cycles, and each of the mount cycles may be associated with a different archive device. In some cases, the archive device may be a tape drive. In addition, the storage tape may initially be free of valid data, and each of the rewritable ALPs may be free of valid data. Moreover, the location of each of the data objects on the storage tape may include a block identification and an ALP identification associated with a start and/or an end of each data object.

According to another aspect or embodiment, a method of interacting with storage media in a storage management system is provided. The method includes using an archive device to store a data object (e.g., a virtual tape volume or host file) within a number of contiguous or non-contiguous partitions on a storage tape, where all of the partitions may be linked to form at least a portion of a logical volume. The method may further include positioning the archive device at a start of the data object and reading the data object as the archive device automatically transitions between each of the partitions forming the logical volume.

In one variation of the method, the step of storing may include providing a writable mask that informs the archive device that each of the partitions is writable and writing the data object within a plurality of the partitions on the storage tape. The storing step may further include recording location information associated with the data object. The location information may include a block identification and an ALP identification associated with a start and/or an end of the data object. In another variation, the storing step may be completed over one or more mount cycles. Moreover, the archive device may be two or more archive devices.

According to another aspect or embodiment, a storage management system is provided. The system includes a storage tape that is divided into a number of partitions, a server running a host application, and an archive device for interfacing with the storage tape. The host application may be operative to identify one or more writable partitions on the storage tape, and those writable partitions may be contiguously or non-contiguously distributed throughout the storage tape. When writing one or more host files to the storage tape, the archive device may be operative to automatically link two or more of the writable partitions to form a logical volume containing the one or more host files. When reading the one or more host files from the storage tape, the archive device may be operative to automatically navigate through the logical volume.

One variation of the storage management system may include a virtual storage management module that is coupled between the server and the archive device. The virtual storage management module may include a virtual tape storage control system, a virtual tape storage subsystem, and a virtual tape library. In this variation, the virtual tape storage control system manages the virtual tape storage subsystem, which in turn controls a passage of host files from the host application to the virtual tape library, from the host application to the archive device, or from the host application to the archive device via the virtual tape library. In another variation of the virtual storage management system, the host application is operative to track location information for each of the one or more host files written to the storage tape. In yet another variation, the host interfaces with the archive device using either a fiber connectivity ("FICON") command protocol or a small computer systems interface ("SCSI") command protocol.

DETAILED DESCRIPTION OF EXEMPLARY EMBODIMENTS

The inventors have recognized that because it is necessary to stack data on magnetic storage media (hereinafter referred to as "storage tapes" or "tapes") to benefit from the large storage capacity of each storage tape and because each data set stacked on a tape may have a different expiration period or other invalidation parameter, storage tapes often develop a significant amount of invalid data that is randomly interspersed throughout the tape. While the tape may be reclaimed in a manner that moves the valid data to a contiguous portion of the tape, thereby freeing the remainder of the tape for rewriting, this process is inconvenient, time consuming, and expensive.

Further, while the well-known process of discretely partitioning tapes allows non-contiguous portions of the tape to be reused, it requires excessive processing power in that a controlling host application must be involved with handling and storing data within each discrete partition. This lack of insulation between the controlling host and the archive device slows data storage and retrieval. The current inability to conveniently utilize a substantial entirety of each large-capacity storage tape within a storage management system presents efficiency challenges for customers in that it requires customers to purchase, maintain, and store a larger number of multiple-volume tape cartridges than would be necessary if fewer cartridges could be used more efficiently.

To address these and other issues, exemplary embodiments of the present invention include a storage system and method for automatically linking partitions on storage tapes. In the storage system and method described, automatically linked partitions ("ALPs") are created on tapes maintained within a tape library. In this regard, one or more data objects (e.g., host files, virtual tape volumes) may be both written to and read from numerous, non-contiguous ALPs on a storage tape with minimal involvement from a controlling host application.

Implementing ALPs on storage tapes allows tapes to be used more efficiently because customers can store more data in less space. By utilizing the substantial whole of each tape, customers can reduce cartridge or cassette count dramatically. Further, and as explained in greater detail below, automatically linking partitions allows an appropriately positioned archive device (e.g., a tape drive) to automatically transition between ALPs on the tape with minimal additional host direction or processing, which improves access times for both read and write operations. That is, the controlling host is able to administer storage (i.e., reading and writing) upon the ALPs while remaining unaware of the data handling complexities that are implemented at the archive device.

Figure 1:
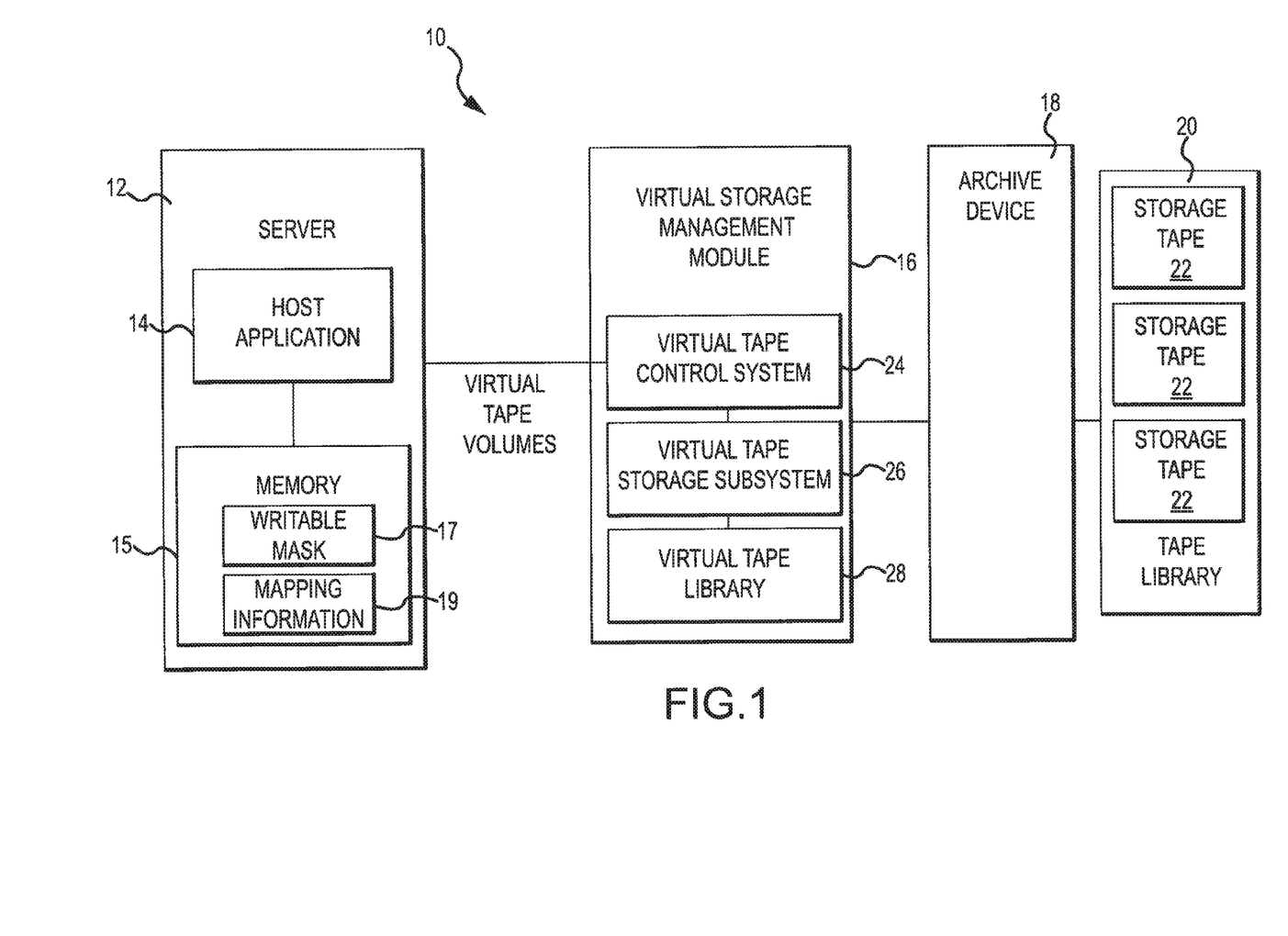
FIG. 1 illustrates a functional block diagram of one embodiment of a virtual storage management system.

To illustrate, one exemplary embodiment of a system and method of automatically linking partitions will be described in terms of a virtual storage management ("VSM") system. In this regard, FIG. 1 illustrates a simplified functional block diagram of one embodiment of a VSM system 10. In this embodiment, the VSM system 10 includes a server 12 (e.g., a mainframe server) having a microprocessor (not shown) that runs a VSM host application 14. The host application (hereinafter "host application" or "host") 14 may be coupled to a memory 15 and may act as a system architect to manage and control the storage of data objects or, in this embodiment, virtual tape volumes ("VTVs"). A virtual storage management module 16 resides between the host application 14 and an archive device 18. The archive device 18 may be any appropriate archive device such as a tape drive, and the VSM system 10 may include several similar archive devices 18. The virtual storage management module 16 may reside within the server 12 or it may be located independent of the server 12 at any appropriate network location. The virtual storage management module 16 includes a virtual tape storage control system ("VTCS") 24 that communicates with the host application 14 and also directs a virtual tape storage subsystem ("VTSS") 26. In turn, the VTSS routes host files either to the archive device 18 or to a virtual tape library 28. At the archive device 18, VTVs are written directly to one of numerous storage tapes 22 that are housed within a tape library 20. The archive device 18 may access tapes housed within the tape library 20 via any appropriate means including, for example, robotic assemblies (not shown) that assist the archive device 18 in selecting, mounting, and dismounting one of the storage tapes 22. The virtual tape library 28 is used to buffer or temporarily cache VTVs, which may ultimately be written to one of the storage tapes 22. Virtual tape libraries as well as real tape libraries and the corresponding robotic assemblies used to access storage tapes are well-known in the art and will not be described further.

Figure 2:
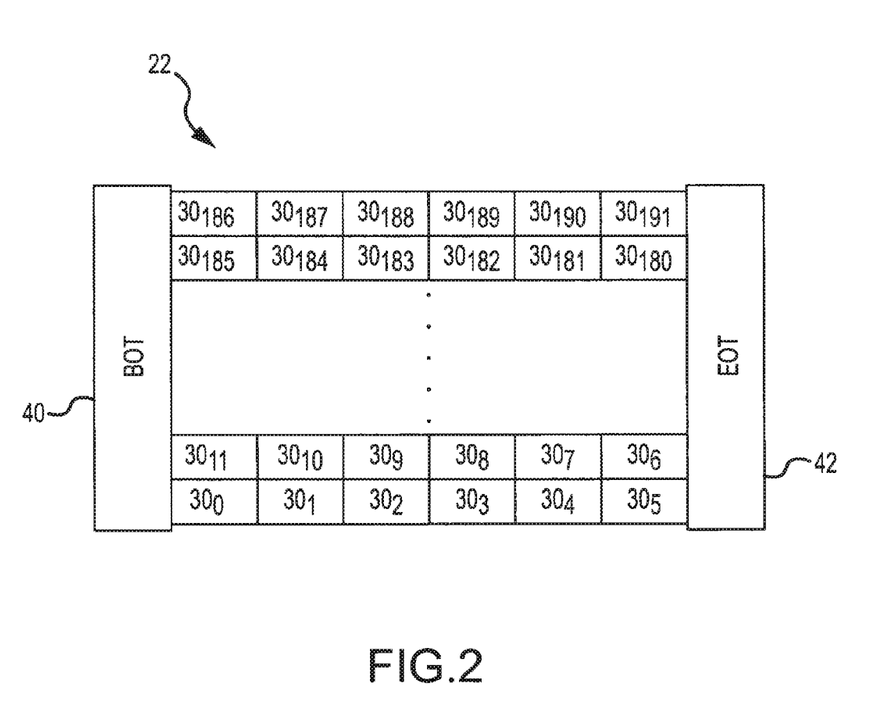
FIG. 2 illustrates a logical diagram of a storage tape for use in the virtual storage management system of FIG. 1.

FIG. 2 presents a logical representation of an embodiment of one of the storage tapes 22. The tape 22 is partitioned both vertically (by sections) and horizontally (by divisions). In this embodiment, the tape 22 is a T10 kB tape with 6 sections and 32 divisions forming numerous ALPs $30_{0-191}$. The capacity of each of the ALPs $30_{0-191}$ varies depending on tape format, but in this embodiment, each ALP stores approximately 4.85 GB of data. Any capacity loss to reach the full 1000 GB capacity is purposeful and allows the ALPS $40_{0-191}$ to be written in any order. The left-most column of FIG. 2 represents a beginning of tape ("BOT") 40 and the right-most column represents an end of tape ("EOT") 42.

FIGS. 3A-F show a sample volume 34 of the storage tape 22 as it undergoes several read and write operations performed by the VSM system 10. Generally, FIGS. 3A-F graphically demonstrate a time-progression of the sample volume 34 from an empty or "free" state, in which the tape 22 is entirely free of valid data, through initialization and writing of a number of host files to ALPs within the sample volume 34, invalidation of one or more of those host files, and writing new host files into ALPs made available for reuse through the invalidation of original host files.

In one embodiment, the tape 22 is initially selected from a "free" group of tapes within the tape library 20 (FIG. 1). As a "free" tape, the tape 22 may be empty or may otherwise be free of valid data. For instance, rather than being empty, all of the data stored on the tape 22 may be expired or otherwise invalid.

Figure 3A:
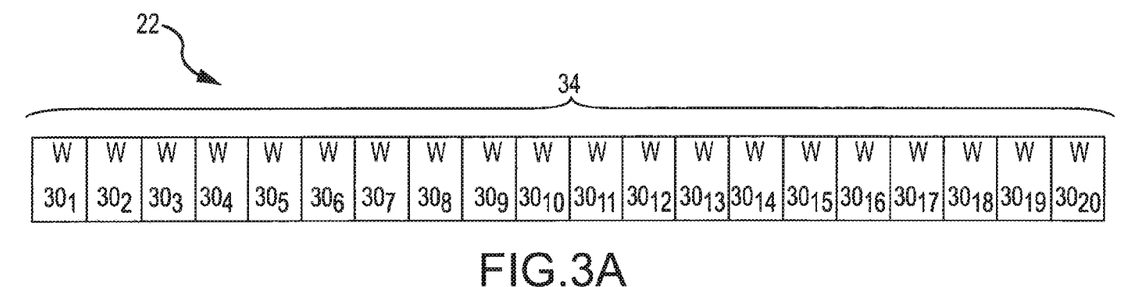
FIG. 3A illustrates a block diagram of a sample volume of the storage tape of FIG. 2.

Before a write operation in ALP mode may begin, the tape 22 is initialized. Initialization involves dividing the tape 22 into a fixed number of writable ALPs. As discussed above with reference to FIG. 2, the complete tape 22 is divided into ALPs $30_{0-191}$. FIG. 3A shows that the sample tape volume 34 contains a portion of those ALPS, or the ALPs $30_{1-20}$. During an ALP mode initialization, the host application 14 also provides a writable mask 17 (FIG. 1) that is stored in the memory 15 to the archive device 18. The writable mask 17 informs the archive device 18 as to which ALPs on the currently mounted tape 22 are available for writing. While the writable mask 17 may use any appropriate mechanism for classifying ALPs, it is generally a bit mask in which a bit value of 1 indicates that a particular ALP is writable, while a bit value of 0 indicates that a particular ALP contains valid data, and therefore, cannot be written to during the current mount cycle. In the example shown in FIG. 3A, the ALPs $30_{1-20}$ in the sample tape volume 34 bear the designation "W," which indicates that all of the ALPs $30_{1-20}$ are writeable immediately following initialization. In addition, the initialization process may include writing a tape identifier or tape mark at a designated location (e.g., the first ALP) on the tape 22.

Figure 3B:
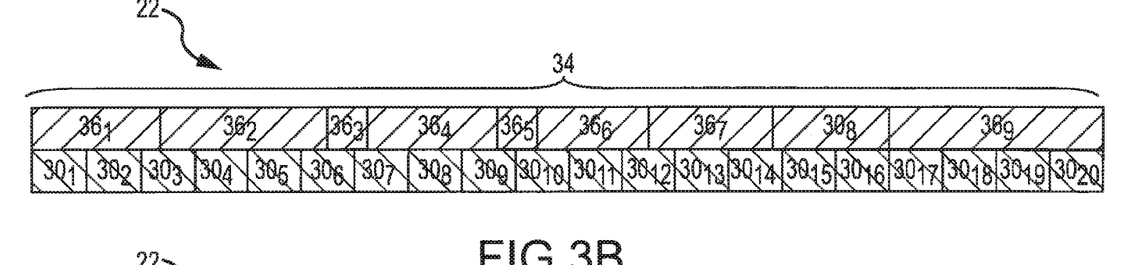
FIG. 3B illustrates a block diagram of the sample tape volume of FIG. 3A with virtual tape volumes written to the sample tape volume.

Once the tape 22 has been initialized, the VSM system 10 may begin writing data to the tape 22 just as it would if in non-ALP mode. That is, the VSM system 10 may fill the tape 22 with data. As shown in FIG. 3B, a number of VTVs $36_{1-9}$ (shown in the top row) are written contiguously across the ALPs $30_{1-20}$ (shown in the bottom row) within the sample tape volume 34. Notably, the process of writing the VTVs $36_{1-9}$ may occur over multiple mount and dismount cycles for the storage tape 22 and across more than one archive device 18.

In connection with the writing process, the host 14 may track mapping or VTV location information 19 (FIG. 1) for the tape 22. The location information may also be stored in the memory 15 (FIG. 1). For instance, at or around the time the VTVs $36_{1-9}$ are written, the host may record the mapping information 19 that identifies a location for each of the VTVs $36_{1-9}$. The host may track and/or record any appropriate location information such as, for example, block and ALP identification information associated with a start and/or an end of each of the VTVs $36_{1-9}$. The host 14 may subsequently use the mapping information 19 to identify which of the ALPs $30_{1-20}$ become available for rewriting as the VTVs $36_{1-9}$ gradually expire, as described below.

Figure 3C:
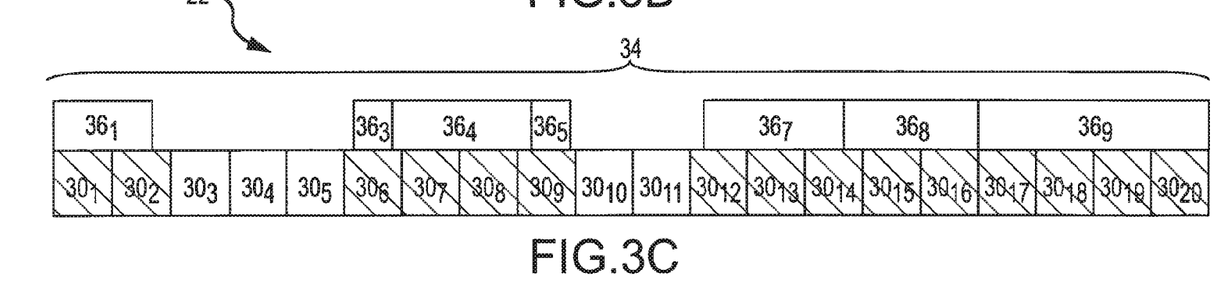
FIG. 3C illustrates a block diagram showing several invalidated virtual tape volumes on the sample tape volume of FIG. 3B.

Over time, the VTVs $36_{1-9}$ will begin to be invalidated, oftentimes through expiration or by user choice. Each of the VTVs $36_{1-9}$ may have a different expiration period, and as a result, the sample tape volume 34 begins to resemble "swiss cheese" as it develops randomized pockets of invalid data spanning one or more of the ALPs $30_{1-20}$. For instance, the progression from FIG. 3B to FIG. 3C shows that the VTVs $36_2$ and $36_6$ have expired, freeing several noncontiguous ALPs for rewriting. In this example, the sample volume 34 may be reclaimed through a process of using the mapping information 19 to identify which of the ALPs $30_{1-20}$ no longer contain any valid data. Based on that identification, the host 14 may build and provide a new or updated writable mask 17 that informs the archive device 18 as to which of the ALPs $30_{1-20}$ have become available for rewriting during the current mount cycle. To identify available or "empty" ALPs, the host 14 may compare the mapping information 19, which identifies ALP and block identification locations for each of the VTVs $36_{1-9}$, with the expired VTVs $36_2$ and $36_6$ to determine that the ALPs $30_{3-5}$, $30_{10}$, and $30_{11}$ no longer contain any valid data and may be rewritten, as shown in FIG. 3C-D.

Upon receipt of the writable mask 17 from the host 14, the archive device 18 may write additional host files to the tape 22. For example, FIG. 3E shows two new VTVs $36_{10-11}$ written to the rewritable ALPs $30_{3-5}$, $30_{10}$, and $30_{11}$ within the sample tape volume 34. After another repetition of freeing ALPs and rewriting data to the tape 22, the sample tape volume 34 may have a physical layout illustrated in FIG. 3F. A comparison of FIGS. 3E-F shows that upon expiration of the original VTVs $36_4$ and $36_8$ (FIG. 3E), new VTVs $36_{12}$ and $36_{13}$ (FIG. 3F) replaced the VTVs $36_4$ and $36_8$ within ALPs $30_{7-8}$ and $30_{15-16}$. Like the original write operations, the process of rewriting new host files within rewritable ALPs may occur over several mount and dismount cycles and be carried out by more than one archive device 18.

Figure 3D:
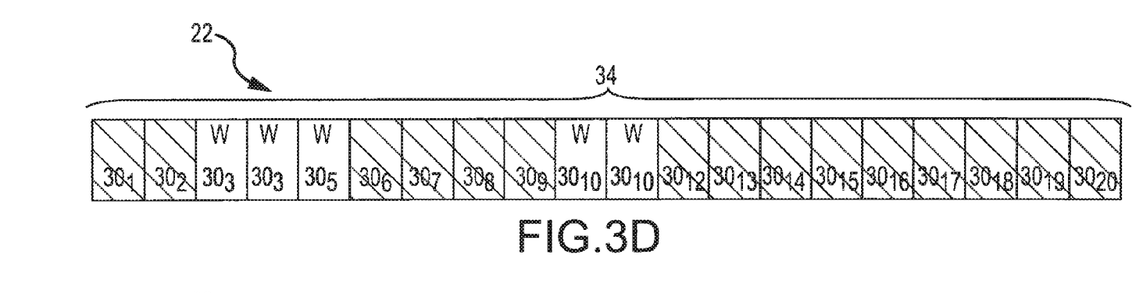
FIG. 3D illustrates a block diagram showing several non-contiguous, writable automatically linked partitions on the sample tape volume of FIG. 3C.
Figure 3E:
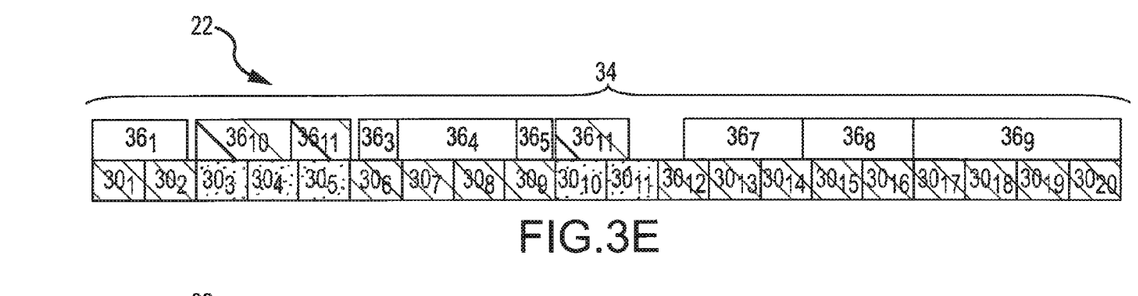
FIG. 3E illustrates a block diagram showing two new virtual tape volumes written to the sample tape volume of FIG. 3D.
Figure 3F:
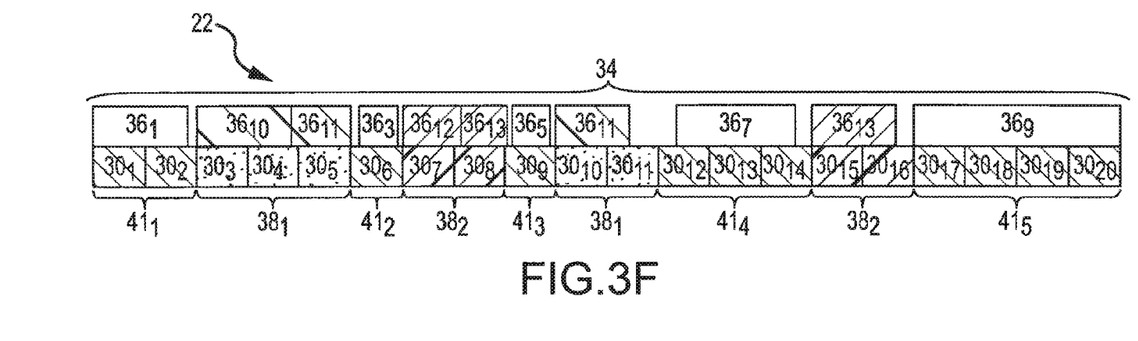
FIG. 3F illustrates a block diagram showing the physical layout of the sample tape volume of FIG. 3E after several repetitions of freeing and rewriting to the automatically linked partitions.

Notably, the archive device 18 allows write operations only in connection with ALPs that the writable mask 17 has identified as writeable (e.g., ALPs $30_{3-5}$, $30_{10}$, and $30_{11}$ in FIG. 3C-D). If the host 14 fails to provide the writable mask 17 at the BOT 40 (FIG. 2) once the tape 22 has been mounted upon the archive device 18, the archive device 18 may default to considering none of the ALPs to be writable. In addition, while the host generally positions the archive device 18 to begin writing within the first writable ALP, the host 14 may position the archive device 18 to begin writing in any one of the writeable ALPs identified in the writable mask 17. For instance, while FIG. 3E shows the VTV $36_{10}$ beginning at the first writable ALP $30_3$, the archive device 18 may be positioned (and the new VTV $36_{10}$ may begin) at a start of any one of the writable ALPs $30_{3-5}$, $30_{10}$, or $30_{11}$ of FIG. 3E. Once a write operation has begun, the archive device 18 operates to automatically link writable ALPs identified in the writable mask 17 in ascending order from a current writable ALP to the next lowest writable ALP following the current writable ALP, without wrapping around the list of writeable ALPs identified in the writeable mask 17. In this regard, the host 14 administers the storage upon the tape 22, but the writing process itself is abstracted by the archive device 18. That is, in writing data to the ALPs $30_{3-5}$, $30_{10}$, or $30_{11}$, the host 14 remains insulated from a majority of the implementation complexities associated with writing to the writable ALPs, thereby preserving processing capability and hastening the writing process.

In addition, by purposefully setting the writable ALPs in the writable mask 17 and/or positioning the archive device 18 to begin writing, the host 14 may control where data is written to the tape 22. For instance, the host 14 may place similar or frequently accessed data close together or at a desired location on the tape 22. In another general example, a storage provider may provide a service such as Internet storage backup. In this capacity, the storage provider could allocate one or more of the ALPs 30 to a particular customer's data. The ALPs 30 may initially be contiguous, with the customer having an option to purchase additional space at a later time. After the purchase of additional storage space, the storage provider may set the writable ALPs in the writable mask 17 to allot the customer additional contiguous or non-contiguous ALPs 30. In one embodiment, the storage provider may track the ALPs 30 that have been dedicated or assigned to the customer, while the host 14 maintained by the storage provider may track the locations of specific files or VTVs as distributed within the assigned ALPs 30. The customer need only understand that it has a continuous amount of data stored on a remote storage tape 18, without care for how the data is distributed. If the customer discontinues service, the ALPs 30 may be invalidated and freed for rewriting by another customer.

While write access is restricted to the writable ALPs identified in the writable mask 17, read access is permitted upon each mount cycle. In this regard, the archive device 18 may read VTVs written to non-contiguous ALPs without host intervention because VTVs are linked together as logical volumes. More particularly, each VTV written to the tape 22 may form all or part of either a partial or complete logical volume through which the archive device 18 may automatically navigate. A complete logical volume is defined as a group of linked ALPs that contain data written from block 0 and continuing to a physical end of data ("EOD"). Looking to FIG. 3F, ALPs $30_{3-5}$ and $30_{10-11}$ (the VTVs $36_{10-11}$) form a first complete logical volume $38_1$ and ALPs $30_{7-8}$ and $30_{15-16}$ (the VTVs $36_{12-13}$) form a second complete logical volume $38_2$. In contrast, a partial logical volume is a group of linked ALPs that lacks either a block 0 or a physical EOD. FIG. 3F illustrates five partial logical volumes $41_{1-5}$, including ALP $30_{1-2}$ (VTV $36_1$), ALP $30_6$ (VTV $36_3$), ALP $30_9$ (VTV $36_5$), ALPs $30_{12-14}$ (VTV $36_7$), and ALPs $30_{17-20}$ (VTV $36_9$), respectively.

In one exemplary read operation, the host 14 may position the archive device 18 to the beginning of the VTV $36_{11}$ by locating first to the ALP $30_4$ and then to the start of the VTV $36_{11}$ (known to the host 14 through the mapping information 19). Because the archive device automatically transitions through logical volumes, the archive device 18 will move from the ALP $30_4$ to the ALP $30_5$ before, automatically transitioning to the ALP $30_{10}$ followed by the ALP $30_{11}$. In this regard, the archive device 18 returns host files accurately without host intervention within each ALP. Like the write operation discussed above, the host 14 may administer the read operation while remaining unaware of and uninvolved in the data handling carried out by the archive device 18. As a result, each read operation may be accomplished more efficiently and using less host processing capability.

Figure 4:
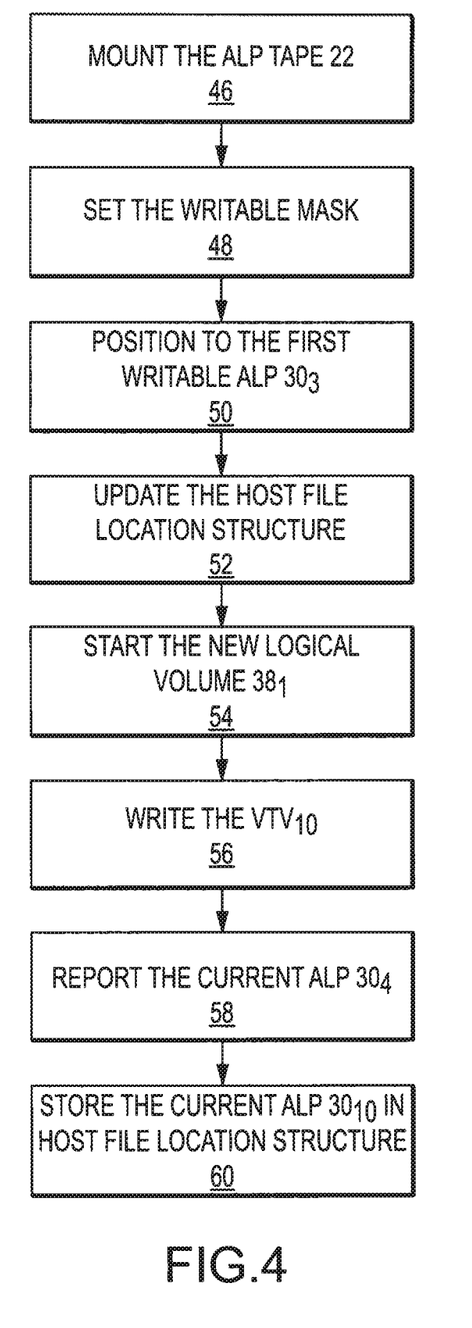
FIG. 4 illustrates a flow-chart detailing one embodiment of the steps for using the virtual storage management system of FIG. 1 to write a new host file to one or more writable automatically linked partitions on the storage tape of FIG. 2.

Embodiments of the method and system for automatically linking tape partitions may be implemented using a series of ALP mode interface commands that are transmitted, sent, and/or executed by the host application 14 running on the server 12. These commands may include any appropriate commands for operating the VSM system 10 in ALP mode and may be defined in any appropriate command protocol, including, for example, the fiber connectivity ("FICON") protocol or the small computer system interface ("SCSI") protocol. To demonstrate, FIG. 4 presents a flow-chart detailing one embodiment of the steps for writing a host file to one or more free or writable ALPs on an ALP tape using a series of FICON commands that are sent, transmitted, or executed by the host application 14 running on the server 12. The process begins with mounting the ALP tape 22 upon the archive device 18 (step 46). At this point, the tape 22 may have the physical layout presented in FIG. 3C. That is, the VTVs $36_2$ and $36_6$ have expired, freeing the ALPs $30_{3-5}$ and $30_{10-11}$ for writing. Once mounted, the host 14 may issue a set writable mask command (step 48), which provides the writable mask 17 to the archive device 18 to inform the archive device 18 of the writable ALPs $30_{3-5}$ and $30_{10-11}$ within which the tape 22 may be written.

Next, the host 14 issues a locate ALP command to position the archive device 18 to the first writable ALP $30_3$ (step 50). Before writing commences, a host file location (e.g., mapping information) structure is updated with an identification of the first writable ALP $30_3$ as well as a host block identification of 0 (step 52). Next, the host 14 issues a start new logical volume command (54) to create the complete logical volume $38_1$ before the new host file, or the VTV$_{10}$, is written as shown in FIG. 3E (step 56). After the VTV$_{10}$ is written, the host issues a report current ALP command (step 58) to determine which ALP contains the end of the VTV$_{10}$. The current ALP location, the ALP $30_4$, is stored in the host file location structure (step 60) for later use in determining when an ALP has become free for rewriting. Specifically, the host 14 may later refer to the host file location structure to determine that the VTV$_{10}$ spanned an entirety of the ALP$_3$ and a portion of the ALP$_4$. Thus, upon expiration of the VTV$_{10}$, the host 14 will discern that ALP$_3$ has become free for rewriting.

Figure 5:
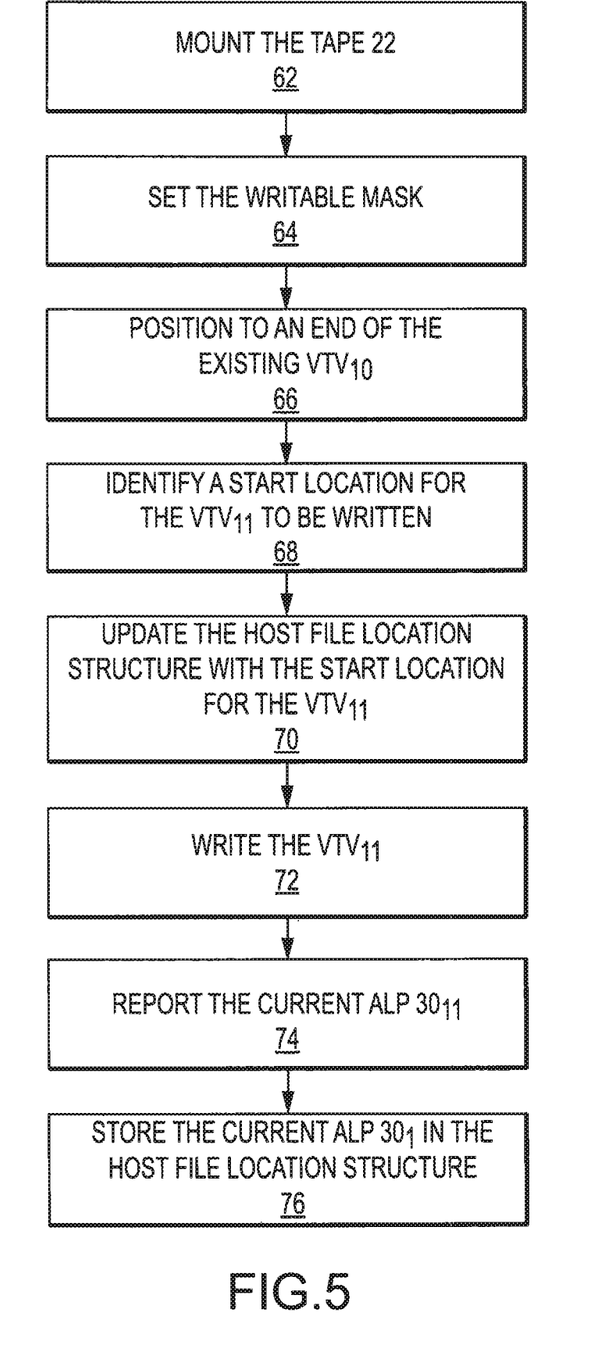
FIG. 5 illustrates a flow-chart detailing one embodiment of the steps for using the virtual storage management system of FIG. 1 to append a new host file to an existing host file written to one or more writable automatically linked partitions on the storage tape of FIG. 2.

As discussed above, the process of writing host files to the tape 22 may occur over several mount and dismount cycles and across more than one archive device 18. Thus, in one embodiment, after the VTC $36_{10}$ is written to the tape 22 in the manner discussed above, the tape 22 may be dismounted, stored in the tape library 20, and later remounted to the archive device 18 for further writing within the remaining writable ALPs. In this regard, FIG. 5 presents a flow-chart detailing an embodiment of the steps for appending a host file to an existing host file within the writable ALPs on the tape 22 using a series of FICON commands that are sent, transmitted, or executed by the host application 14 running on the server 12. Specifically, to append the VTC $36_{11}$ to the VTC $36_{10}$, as shown in FIG. 3E, the tape 22 is first mounted upon the archive device 18 (step 62). Next, the host 14 issues a set writable mask command (step 64) so that the tape 22 is eligible to be written. Once the writable mask 17 has been provided to the archive device 18, the host 14 may position the archive device 18 to an end of the existing VTV$_{10}$ (step 66), by issuing a locate ALP command to the $ALP_4$ followed by a standard tape locate command to position to the end of the $VTV_{10}$. The host 14 may then issue a report current ALP command and a standard read position command to identify location information (i.e., current ALP and block identification) for a start location of the new $VTV_{11}$ to be written (step 68), as discussed above. The host 14 stores the location information in the host file location (e.g., mapping information) structure for later use (step 70). Next, the new $VTV_{11}$ is written as shown in FIG. 3E (step 72). After the $VTV_{11}$ is written, the host issues a report current ALP command (step 74) to determine which ALP contains the end of the $VTV_{11}$. The current ALP $30_{11}$, is then stored in the host file location structure (step 76), allowing the host 14 to determine when the ALPs $30_{4-5}$ and $30_{10-11}$ become free for rewriting based on the starting ALP $30_4$ and the current ALP $30_{11}$.

Figure 6:
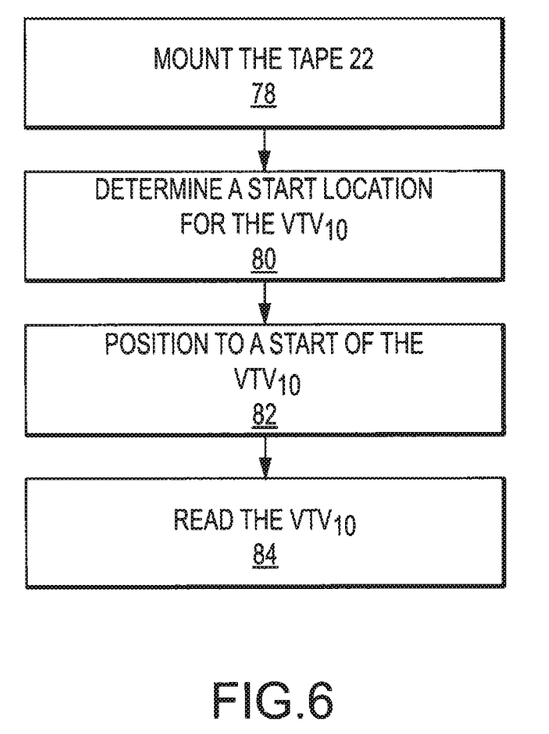
FIG. 6 illustrates a flow-chart detailing one embodiment of the steps for using the virtual storage management system of FIG. 1 to read a host file from one or more automatically linked partitions on the storage tape of FIG. 2.

FIG. 6 illustrates a flow-chart detailing one embodiment of the steps for reading a host file in ALP mode using a series of FICON commands that are sent, transmitted, or executed by the host application 14 running on the server 12. First, the tape 22 is mounted upon the archive device 18 (step 78). Second, the host 14 determines a start location for the host file (step 80) by referencing the host file location structure. For example, by referring to the host file location structure, the host 14 may determine that the $VTV_{10}$ begins at block 0 of ALP $30_3$, as shown in FIG. 3E. Next, the host 14 may position the archive device 18 to the start of the $VTV_{10}$ (step 82) by issuing a locate ALP command to the ALP $30_3$ and then issuing a standard tape locate command to move the archive device 18 to the start of the $VTV_{10}$. After positioning to the $VTV_{10}$, the host file may be read using standard tape read commands (step 84). The archive device 18 will automatically transition through the complete logical volume $38_1$ to which the $VTV_{10}$ belongs. In other words, the archive device 18 will automatically transition from the ALP $30_3$ to the next ALP as necessary. In this embodiment, the archive device 18 will automatically transition from ALP $30_3$ to ALP $30_4$ in reading the $VTV_{10}$.

Although the invention has been described and illustrated with a certain degree of particularity, it is understood that the present disclosure has been made only by way of example, and that numerous changes in the type, combination, and arrangement of parts can be resorted to by those skilled in the art without departing from the spirit and scope of the invention, as hereinafter claimed. For instance, while the system and method for automatically linking partitions has been described with respect to a virtual storage management system, the system and method is also applicable to any application using storage media such as magnetic storage tapes or cartridges. In addition, while several FICON interface commands have been described as useful in implementing the invention, these commands are not all-encompassing and the invention contemplates any set of commands, defined in any appropriate protocol, that are necessary to perform an individual host application's requirements. Further, while exemplary uses for certain commands have been described, the invention contemplates any appropriate use of the defined commands to achieve the host application's requirements.

We claim:

1. A method of interacting with storage media in a storage management system, comprising:
    storing, using an archive device, a data object within a plurality of partitions on a storage tape, wherein one or more of said partitions are non-contiguous, and wherein all of said partitions are linked to form at least a portion of a logical volume;
    positioning said archive device at a start of said data object; and
    using said archive device, reading said data object, wherein said archive device automatically transitions between each of said partitions forming said logical volume.

2. The method of claim 1, wherein said storing step comprises:
    providing, by a host application running on a server to said archive device, a writable mask that informs said archive device that each of said partitions is writeable; and
    writing, by said archive device to said storage tape, said data object within said plurality of said partitions on said storage tape.

3. The method of claim 2, wherein said storing step further comprises recording, by said host application, location information associated with said data object.

4. The method of claim 3, wherein said location information comprises a block identification and an ALP identification associated with at least one of a start and an end of said data object.

5. The method of claim 1, wherein said data object is a virtual tape volume (VTV).

6. The method of claim 1, wherein said storing step is completed over one or more mount cycles.

7. The method of claim 1, wherein said archive device comprises two or more archive devices, and wherein at least one of said archive devices is a tape drive.

8. A method of writing data to storage media, comprising:
    dividing a storage tape into a number of writable automatically linked partitions (ALPs);
    first providing, from a host application running on a server to an archive device upon which said storage tape is mounted, a writable mask that informs said archive device of said writable ALPs;
    first writing, by said archive device to said storage tape, a first set of data objects to said storage tape, wherein said data objects span a contiguous portion of said writable ALPs;
    tracking, by said host application, mapping information for said data objects, wherein said mapping information identifies a location of each of said data objects written to said storage tape;
    using said mapping information upon an invalidation of one or more of said data objects, identifying rewritable ALPs, wherein said rewritable ALPs are distributed contiguously or non-contiguously on said storage tape;
    second providing, from said host application running on said server to said archive device, an updated writeable mask that informs said archive device of said rewritable ALPs; and
    second writing, by said archive device to said storage tape, an additional set of said data objects within one or more of said rewritable ALPs, wherein said archive device automatically transitions between said rewritable ALPs.

9. The method of claim 8, further comprising continuously repeating said tracking step, said identifying step, said second providing step, and said second writing step.

10. The method of claim 8, wherein at least one of said first and second writing steps is completed over two or more mount cycles, wherein each of said mount cycles comprises mounting said storage tape to and dismounting said storage tape from said archive device.

11. The method of claim 10, wherein each of said mount cycles is associated with a different archive device, and wherein one of said archive devices is a tape drive.

12. The method of claim 8, wherein said data objects are virtual tape volumes (VTVs).

13. The method of claim 8, wherein prior to said dividing step, said storage tape is free of valid data.

14. The method of claim 8, wherein said invalidation of said data objects comprises an expiration of said data objects.

15. The method of claim 8, wherein each of said rewritable ALPs is free of valid data.

16. The method of claim 8, wherein said location of each of said data objects on said storage tape comprises a block identification and an ALP identification associated with at least one of a start and an end of each of said data objects.

17. A storage management system using a storage tape that is divided into a plurality of partitions, comprising:
- a server running a host application, wherein said host application is operative to identify one or more writable partitions on said storage tape, wherein said writable partitions are contiguously or non-contiguously distributed throughout said storage tape;
- an archive device for interfacing with said storage tape, wherein when writing one or more host files to said storage tape, said archive device is operative to automatically link two or more of said writable partitions to form a logical volume that contains said one or more host files, and wherein when reading said one or more host files from said storage tape, said archive device is operative to automatically navigate through said logical volume.

18. The storage management system of claim 17, further comprising a virtual storage management module coupled between said server and said archive device, said virtual storage management module including a virtual tape storage control system, a virtual tape storage subsystem, and a virtual tape library, wherein said virtual tape storage control system manages said virtual tape storage subsystem, and wherein said virtual tape storage subsystem controls a passage of host files from said host application to said virtual tape library, from said host application to said archive device, or from said host application to said archive device via said virtual tape library.

19. The virtual storage management system of claim 17, wherein said host application is further operative to track location information for each of said one or more host files written to said storage tape.

20. The virtual storage management system of claim 17, wherein said host application interfaces with said archive device using one of a fiber connectivity (FICON) command protocol and a small computer systems interface (SCSI) command protocol.

* * * * *

UNITED STATES PATENT AND TRADEMARK OFFICE
CERTIFICATE OF CORRECTION

PATENT NO. : 9,098,210 B2  
APPLICATION NO. : 12/608161  
DATED : August 4, 2015  
INVENTOR(S) : McCallister et al.

Page 1 of 1

It is certified that error appears in the above-identified patent and that said Letters Patent is hereby corrected as shown below:

In the specification,

In column 6, line 41, delete "FIG." and insert -- FIGS. --, therefor.

In column 6, line 50, delete "VTVs. $36_{12}$" and insert -- VTVs $36_{12}$ --, therefor.

In column 6, line 58, delete "FIG." and insert -- FIGS. --, therefor.

In column 7, line 58, delete "$30_{12-14}$(VTV $36_7$)," and insert -- $30_{12-14}$ (VTV $36_7$), --, therefor.

In column 7, line 58, delete "$30_{17-20}$(VTV $36_9$)," and insert -- $30_{17-20}$ (VTV $36_9$), --, therefor.

Signed and Sealed this  
Fifteenth Day of March, 2016

Michelle K. Lee  
*Director of the United States Patent and Trademark Office*